(12) United States Patent
Yoshida et al.

(10) Patent No.: US 8,472,730 B2
(45) Date of Patent: Jun. 25, 2013

(54) IMAGE COMMUNICATION APPARATUS AND COMPUTER READABLE MEDIUM FOR CONTROLLING IMAGE COMMUNICATION

(75) Inventors: Minoru Yoshida, Saitama (JP); Yoshiaki Tezuka, Kanagawa (JP); Nobuyuki Oobayashi, Kanagawa (JP); Hideki Fujii, Saitama (JP); Hitoshi Tamura, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 965 days.

(21) Appl. No.: 12/553,548

(22) Filed: Sep. 3, 2009

(65) Prior Publication Data

US 2010/0209011 A1      Aug. 19, 2010

(30) Foreign Application Priority Data

Feb. 13, 2009    (JP) ................................. 2009-031532

(51) Int. Cl.
*G06K 9/36* (2006.01)
(52) U.S. Cl.
USPC .......................................... 382/232; 382/244

(58) Field of Classification Search
USPC ......... 382/232, 233, 239, 244, 305; 358/1.15, 358/402, 403, 405, 407
See application file for complete search history.

(56) References Cited

FOREIGN PATENT DOCUMENTS

| JP | A-8-307394 | 11/1996 |
|---|---|---|
| JP | A-10-304205 | 11/1998 |
| JP | A-2002-77637 | 3/2002 |
| JP | A-2002-218194 | 8/2002 |
| JP | A-2008-103931 | 5/2008 |

OTHER PUBLICATIONS

Japanese Office Action issued in Japanese Patent Application No. 2009-031532 on Nov. 22, 2010 (with translation).

*Primary Examiner* — Duy M Dang
(74) *Attorney, Agent, or Firm* — Oliff & Berridge, PLC

(57) ABSTRACT

An image communication apparatus includes an unit for obtaining a threshold value that determines a coding format used for transmission of an image stored for the transmission from an information of the image stored for the transmission; and a transmission controlling unit that transmits the image stored for the transmission using a JBIG format if a size of the image stored for the transmission exceeds the threshold value, and transmits the image using a coding format having a compression ratio lower than that of the JBIG format if the size of the image stored for the transmission does not exceed the threshold value.

7 Claims, 5 Drawing Sheets

FIG. 3

| | TYPE 1 | TYPE 2 | TYPE 3 | TYPE 4 | TYPE 5 | TYPE 6 |
|---|---|---|---|---|---|---|
| CHARACTER | | 680 | 160 | 40 | 160 | 160 |
| PHOTOGRAPH (ERROR DIFFUSION) | | 900 | 220 | 60 | 0 | 0 |
| PHOTOGRAPH (DITHER) | | 770 | 200 | 50 | 0 | 0 |
| CHARACTER PHOTOGRAPH | | 750 | 190 | 45 | 190 | 0 |
| INDISTINCTNESS | | COMMON TO CHARACTER | | | | |

FIG. 4

| | | COEFFICIENT | | | |
|---|---|---|---|---|---|
| | | CHARACTER | PHOTOGRAPH (ERROR DIFFUSION) | PHOTOGRAPH (DITHER) | CHARACTER PHOTOGRAPH |
| RESOLUTION COEFFICIENT | 600 | 5.30 | 7.00 | 6.80 | 6.90 |
| | 400 | 2.90 | 3.10 | 3.00 | 3.15 |
| | 200 | 1.00 | 1.00 | 1.00 | 1.00 |
| | STANDARD | 0.60 | 0.55 | 0.50 | 0.65 |
| SIZE COEFFICIENT | A3 | 2.00 | | | |
| | B4 | 1.50 | | | |
| | A4 | 1.00 | | | |
| ELONGATION COEFFICIENT | | RATIO OF SUB SCAN LENGTH TO STANDARD LENGTH | | | |

IMAGE COMMUNICATION APPARATUS AND COMPUTER READABLE MEDIUM FOR CONTROLLING IMAGE COMMUNICATION

CROSS-REFERENCE TO RELATED APPLICATION

This application is based on and claims priority under 35 USC 119 from Japanese Patent Application No. 2009-031532 filed on Feb. 13, 2009.

BACKGROUND

1. Technical Field

The present invention relates to an image communication apparatus and an image communication control program.

2. Related Art

In the prior art, facsimile machines for conducting communication in a communication format with a low real time performance using a protocol of ITU (International Telecommunication Union)-T.37 through an IP network (network such as Internet, Intranet, or the like, using an Internet protocol) have employed a coding format such as JBIG, or the like, for code compression of image information.

On the other hand, facsimile machines for conducting communication in a communication format with a high real time performance using a protocol of ITU-T.30 through a public switched telephone network (PSTN) have employed a coding format such as MH/MR/MMR, or the like, for code compression of image information.

In recent years, image communication apparatuses equipped with a protocol of ITU-T.38 for conducting communication in a communication format with a high real time performance through a network have been developed. However, in such a type of image communication apparatus, using a coding format such as JBIG for high code compression of image information may cause a so-called "underrun" of communication by which image information to be transmitted can not be produced. For example, if a document to be transmitted is white, since the amount of data after compression is too small, data intended to be transmitted are insufficient, which is most likely to cause an underrun.

SUMMARY

According to an aspect of the invention, an image communication apparatus includes an unit for obtaining a threshold value that determines a coding format used for transmission of an image stored for the transmission from an information of the image stored for the transmission; and a transmission controlling unit that transmits the image stored for the transmission using a JBIG format if a size of the image stored for the transmission exceeds the threshold value, and transmits the image using a coding format having a compression ratio lower than that of the JBIG format if the size of the image stored for the transmission does not exceed the threshold value.

BRIEF DESCRIPTION OF THE DRAWINGS

Exemplary embodiments of the invention will be described in detail based on the following figures, wherein:

FIG. 3 is a view showing an example of a table storing basic threshold values used to determine a coding format;

FIG. 4 is a view showing an example of a table storing coefficients used to calculate threshold values for determining a coding format.

DETAILED DESCRIPTION

Hereinafter, one exemplary embodiment of the present invention will be described in detail with reference to the accompanying drawings.

Exemplary Embodiment

Figure 1:
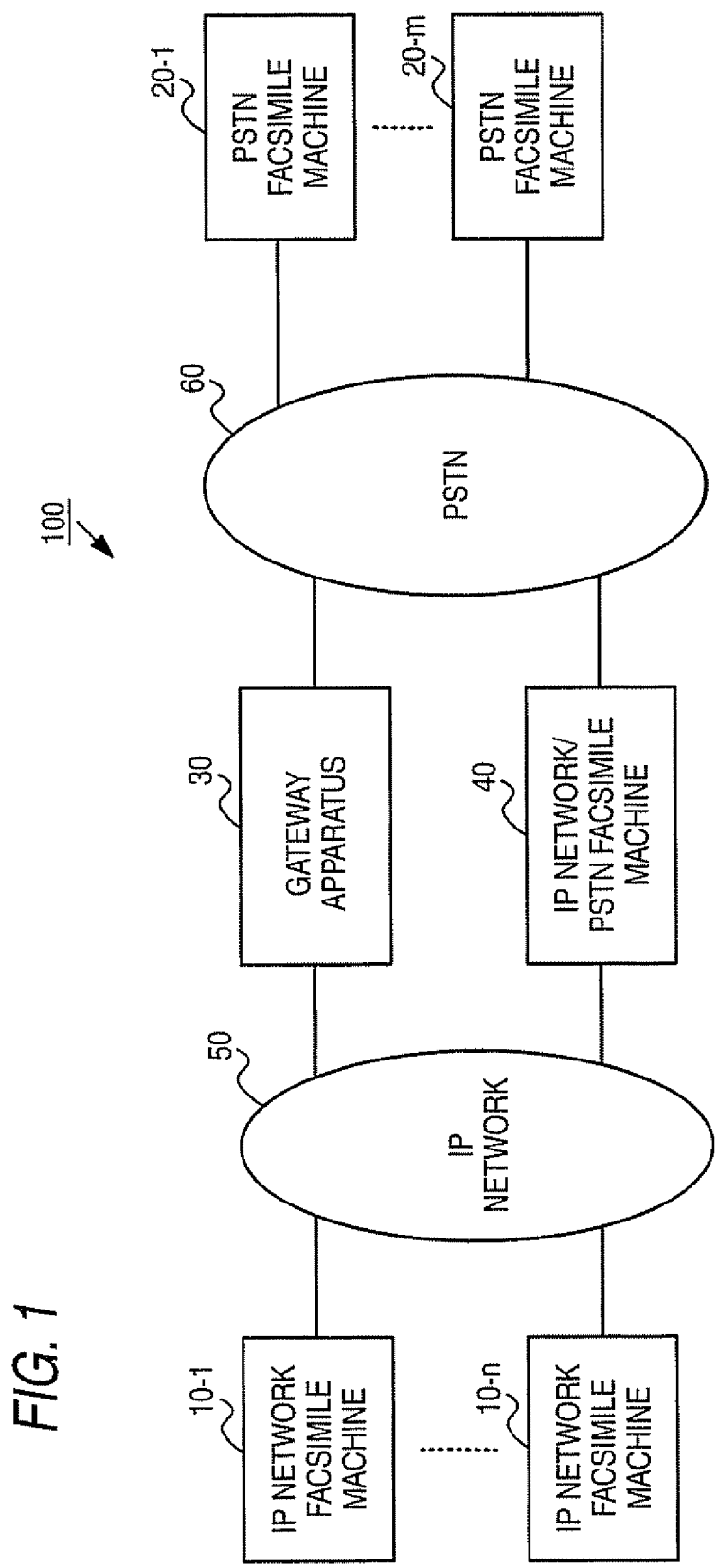
FIG. 1 is a block diagram showing a general configuration of an image communication system according to the present invention.

FIG. 1 is a block diagram showing a general configuration of an image communication system according to the present invention. An image communication system 100 includes plural of IP network facsimile machines 10-1 to 10-n connected to an IP network 50, plural of PSTN facsimile machines 20-1 to 20-m connected to a PSTN 60, a gateway apparatus 30 connected to the IP network 50 and the PSTN 60, and an IP network/PSTN facsimile machine 40 connected to the IP network 50 and the PSTN 60.

Here, the IP network facsimile machines 10-1 to 10-n are facsimile machines for conducting communication with counterpart terminals via the IP network 50.

The PSTN facsimile machines 20-1 to 20-m are facsimile machines for conducting communication with counterpart terminals via the PSTN 60.

The gateway apparatus 30 is a relay apparatus which is connected to the IP network facsimile machines 10-1 to 10-n using a protocol of SIP-T.38 in the IP network 50 and is connected to the PSTN facsimile machines 20-1 to 20-m using a protocol of ITU-T.30 as a modem in the PSTN 60.

The IP network/PSTN facsimile machine 40 is a facsimile machine for conducting communication with a counterpart terminal via the IP network 50 and the PSTN 60.

Figure 2:
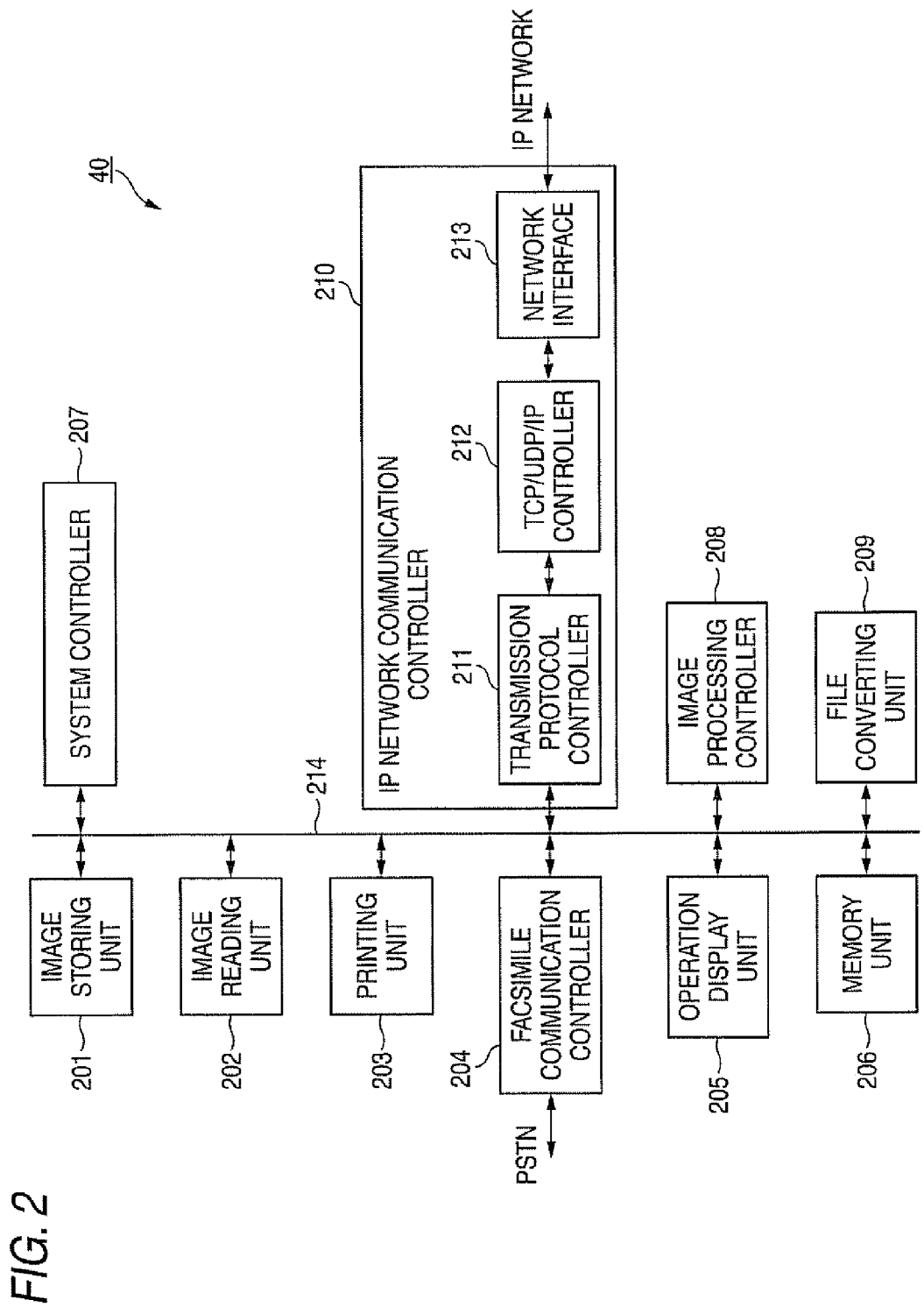
FIG. 2 is a block diagram showing a detailed configuration of an IP network/PSTN facsimile machine 40 shown in FIG. 1.

FIG. 2 is a block diagram showing a detailed configuration of the IP network/PSTN facsimile machine 40 shown in FIG. 1.

In FIG. 2, the IP network/PSTN facsimile machine 40 includes an image storing unit 201, an image reading unit 202, a printing unit 203, a facsimile communication controller 204, an operation display unit 205, a memory unit 206, a system controller 207, an image processing controller 208, a file converting unit 209 and an IP network communication controller 210, all of which are interconnected by a bus 214.

The image storing unit 201 stores an image read or received from the image reading unit 202.

The image reading unit 202 reads a document image with a predetermined resolution and the printing unit 203 prints an image with a predetermined resolution.

The facsimile communication controller 204 is connected to the PSTN 60 shown in FIG. 1 and controls facsimile communication through the PSTN 60.

The operation display unit 205 has various operation keys and indicators used to operate the apparatus 40. The memory unit 206 is RAM for storing system data, communication information and so on. The system controller 207 performs a control processing for the whole of the apparatus 40.

The image processing controller 208 performs processes such as encoding, decoding, enlargement, reduction and the like for image data. The file converting unit 209 performs a converting process for a file format.

The IP network communication controller 210 is connected to the IP network 50 shown in FIG. 1, controls the facsimile communication through the IP network 50, and includes a transmission protocol controller 211, a TCP/UDP/IP controller 212 and a network interface 213.

The transmission protocol controller 211 performs a transmission protocol control for HTTP, SIP and so on. The TCP/UDP/IP controller 212 performs a protocol control for a transport/network layer of the Internet. The network interface 213 is connected to the IP network 50 and performs a communication control for a data link layer or below.

Next, a process of the image processing controller 208 shown in FIG. 2 will be described.

In case where a JBIG coding format is employed, if a JBIG compression ratio of a transmission image is high, since the amount of data after compression is too small, data intended to be transmitted are insufficient, which is most likely to cause a so-called "underrun" of communication by which image information to be transmitted can not be produced. In particular, in a concurrent in which plural of programs operates in synchronous cooperation, the underrun may frequently occur due to competition of CPU.

In this exemplary embodiment, when the image processing controller 208 determines that the JBIG compression ratio of the transmission image is high, it stops the JBIG coding format and converts the JBIG coding format into a different coding format such as MH/MR/MMR, or the like.

Specifically, in this exemplary embodiment, the image processing controller 208 calculates a threshold value for determining a coding format from the coding format, kind, resolution and main scan width of the transmission image stored in the image storing unit 201 and compares an encoded image size of the transmission image with the calculated threshold value for each page of the transmission image. The image processing controller 208 transmits an image using the JBIG coding format if the image size exceeds the threshold value, while transmitting the image using an MH/MR/MMR coding format, or the like, instead of the JBIG coding format if the image size does not exceed the threshold value.

FIG. 3 is a view showing an example of a table storing basic threshold values used to determine a coding format.

The table shown in FIG. 3 is stored in advance in the memory unit 206 of FIG. 2 and contains basic threshold values set to determine a coding format for each type according to the kind of the transmission image and use conditions of the apparatus.

Specifically, as shown in FIG. 3, in the table are set 5 kinds of the transmission image, that is, "character", "photograph (error diffusion)" which is a photographic image processed by an error diffusing method, "photograph (dither)" which is a photographic image processed by a dithering method, "character photograph" which is a mixture of characters and photographs, and "indistinctness", and 6 kinds of types of use conditions, that is, "type 1" to "type 6". Here, the unit of the basic threshold values set for each kind of the transmission image and each type of the use conditions is "KB (kilobyte)".

In use of the apparatus, a desired one of the 6 kinds of types is selected and set depending on the use conditions, or the like, of the apparatus and is stored as system data in the memory unit 206.

FIG. 4 is a view showing an example of a table storing coefficients used to calculate threshold values for determining a coding format.

The table shown in FIG. 4 is also stored in advance in the memory unit 206 of FIG. 2 and contains coefficients set to calculate the threshold values for determining a coding format in association with resolution, size and elongation (including an LEF (horizontal feeding direction) document) of the transmission image and the kind of the transmission image.

For example, resolution coefficients are set in association with the resolution of the transmission image of "600," "400," "200" and "standard" and the kind of transmission images of "character", "photograph (error diffusion)", "photograph (dither)" and "character photograph", size coefficients are set in association with the document sizes of "A3", "B4" and "A4", and ratios of sub scan length to standard length are set elongation coefficients.

Figure 5:
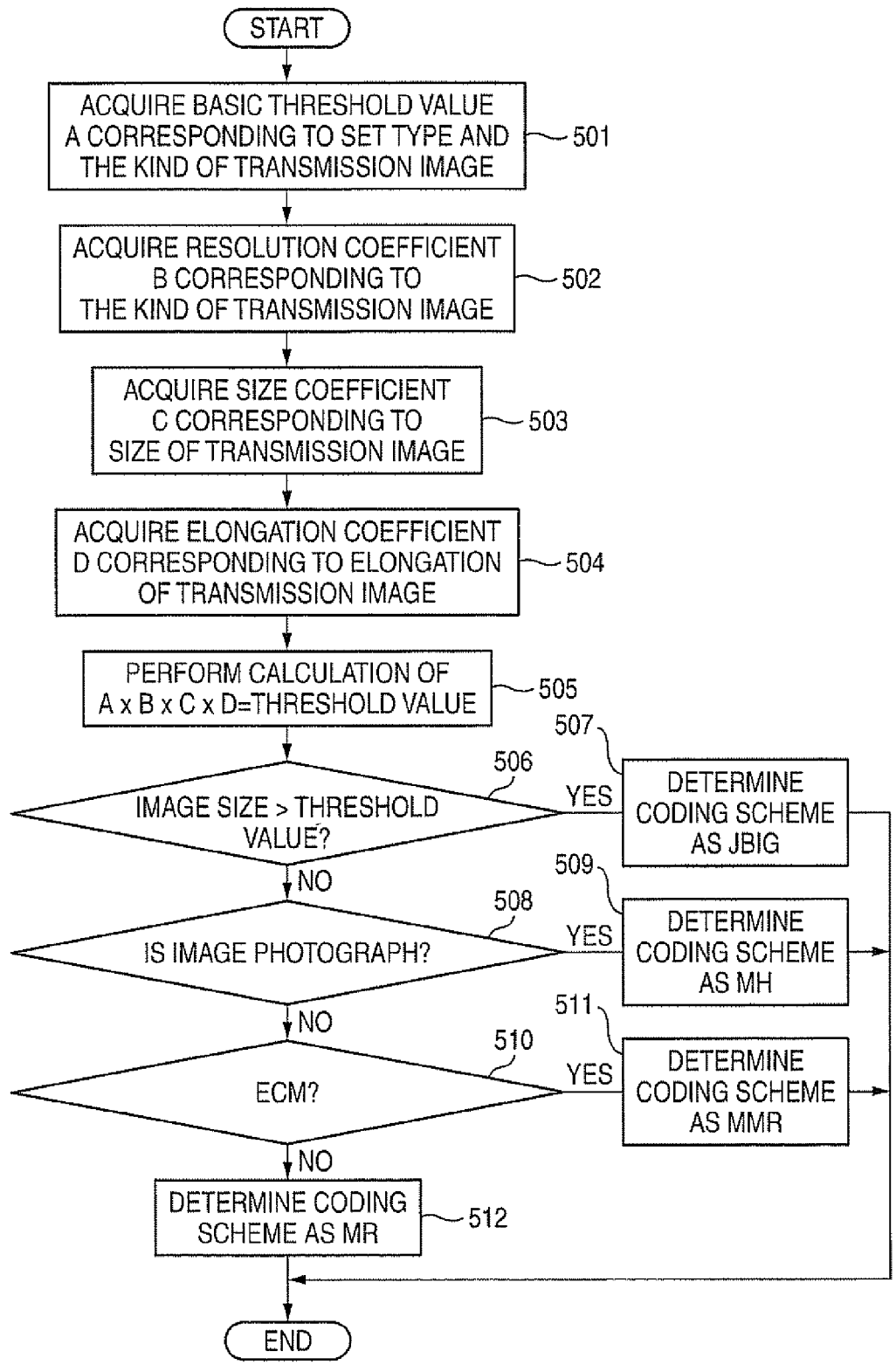
FIG. 5 is a flow chart showing a method of calculating threshold values and determining a coding format using the tables shown in FIGS. 3 and 4.

FIG. 5 is a flow chart showing a process of calculating threshold values and determining a coding format using the tables shown in FIGS. 3 and 4.

In the flow chart of FIG. 5, JBIG is determined as a coding format if an image size exceeds a threshold value. On the other hand, if the image size does not exceed the threshold value, MH is determined as a coding format in the case where the transmission image is a photograph, MMR is determined as a coding format in the case where the transmission image has an ECM (error correction function) set instead of a photograph, and MR is determined as a coding format in the case where the transmission image is not a photograph and has no ECM set.

At start of this process, the table of FIG. 3 is first used to acquire a basic threshold value A corresponding to a set type and the kind of the transmission image (Step 501).

Next, the table of FIG. 4 is used to acquire a resolution coefficient B corresponding to the kind of transmission image (Step 502), acquire a size coefficient C corresponding to the size of the transmission image (Step 503), and acquire an elongation coefficient D corresponding to the elongation of the transmission image (Step 504).

Next, a threshold value for determining a coding format is calculated according to an operation of A×B×C×D (Step 505).

Next, the size of the transmission image is compared with the threshold value calculated in Step 505 (Step 506). If it is determined that the image size exceeds the threshold value (YES in Step 506), JBIG is determined as a coding format (Step 507).

If it is determined in Step 506 that the image size does not exceed the threshold value (NO in Step 506), then it is checked whether or not the transmission image is a photograph (Step 508). If it is checked that the transmission image is a photograph (YES in Step 508), MH is determined as a coding format (Step 509).

If it is checked at Step 508 that the transmission image is not a photograph (NO in Step 508), then it is checked whether or not the transmission image is an ECM (Step 510). If it is checked that the transmission image is an ECM (YES in Step 510), MMR is determined as a coding format (Step 511). If it is checked that the transmission image is not an ECM (NO in Step 510), MR is determined as a coding format (Step 512).

For example, if the size of the transmission image is A4 and SEF (horizontal feeding direction), the kind thereof is a character, the resolution thereof is standard, the image size is 32 KB, and the system data is type 4, "40" is acquired as the basic threshold value from the table of FIG. 3, "0.60", "1.00" and "1.00" are acquired as the resolution coefficient, the size coefficient and the elongation coefficient, respectively, from the table of FIG. 4, and a threshold value for determining a coding format becomes 24.0 KB (=40×0.60×1.00×1.00). In this case, since the image size is larger than the threshold value, JBIG is determined as a coding format.

Although the present invention has been described by way of the above exemplary embodiment, the present invention is not limited to the above exemplary embodiment and the accompanying drawings but may be modified in an appropriate manner without departing from the spirit and scope of the invention.

In addition, although it has been illustrated in the above exemplary embodiment that the threshold value is obtained through a calculation from information of the stored transmission image, a table which stores the image information and the threshold value in their association is prepared and the threshold value may be obtained using the table.

In addition, the image communication control may be performed using a central processing unit based on an image communication control program stored in a storage device.

Moreover, the image communication control program may be provided by not only communication unit such as a network, or the like, but also an external recording medium such as CD-ROM, DVD, or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An image communication apparatus comprising:
   an unit for obtaining a threshold value that determines a coding format used for transmission of an image stored for the transmission from an information of the image stored for the transmission; and
   a transmission controlling unit that transmits the image stored for the transmission using a JBIG format if a size of the image stored for the transmission exceeds the threshold value, and transmits the image using a coding format having a compression ratio lower than that of the JBIG format if the size of the image stored for the transmission does not exceed the threshold value,
   wherein the unit for obtaining the threshold value includes:
      a storing unit that stores coefficients set for each of kind, resolution and main scan width of the image; and
      a calculating unit that calculates the threshold value by multiplying the coefficients by a basic threshold value corresponding to a coding format of the image stored for the transmission.

2. The image communication apparatus according to claim 1, wherein the transmission controlling unit includes:
   a determining unit that compares the threshold value with the size of the image stored for the transmission to determine whether or not the size of the image stored for the transmission is below the threshold value; and
   a converting unit that converts a coding format of the image stored for the transmission from the JBIG format into a coding format having a compression ratio lower than that of the JBIG format if the determining unit determines that the size of the image stored for the transmission is below the threshold value.

3. The image communication apparatus according to claim 1, wherein the information of the image includes information of a coding format, kind, resolution and main scan width of the image stored for the transmission.

4. The image communication apparatus according to claim 1, further comprising:
   a setting unit that sets a plurality of basic threshold values according to use conditions; and
   a selecting unit that selects a desired one of the plurality of basic threshold values set by the setting unit according to the use conditions.

5. The image communication apparatus according to claim 1, further comprising
   a determining unit that determines whether the apparatus is connected to a public network via a gateway or an IP network,
   wherein a conversion of the coding format by the transmission controlling unit is not performed if the determining unit determines that the apparatus is connected to the public network via the gateway.

6. An image communication apparatus comprising:
   an unit for obtaining a threshold value that determines a coding format used for transmission of an image stored for the transmission from information of the image stored for the transmission; and
   a converting unit that compares the threshold value with a size of the image stored for the transmission, and converts a first coding format to encode the image stored for the transmission into a second coding format having a compression ratio lower than that of the first coding format if the size of the image stored for the transmission exceeds the threshold value,
   wherein the unit for obtaining the threshold value includes:
      a storing unit that stores coefficients set for each of kind, resolution and main scan width of the image; and
      a calculating unit that calculates the threshold value by multiplying the coefficients by a basic threshold value corresponding to a coding format of the image stored for the transmission.

7. A non-transitory computer readable storage medium storing a program causing a computer to execute a process for controlling image communication, the process comprising:
   obtaining a threshold value that determines a coding format used for transmission of an image stored for the transmission from information of the image stored for the transmission; and
   transmitting the image stored for the transmission using a JBIG format if a size of the image stored for the transmission exceeds the threshold value, and transmitting the image using a coding format having a compression ratio lower than that of the JBIG format if the size of the image stored for the transmission does not exceed the threshold value,
   wherein obtaining the threshold value includes:
      storing coefficients set for each of kind, resolution and main scan width of the image; and
      calculating the threshold value by multiplying the coefficients by a basic threshold value corresponding to a coding format of the image stored for the transmission.

* * * * *